United States Patent
Yu et al.

(10) Patent No.: US 12,351,106 B2
(45) Date of Patent: Jul. 8, 2025

(54) VEHICLE WINDOW ASSEMBLY WITH PLURALITY OF LIGHT GUIDE STRIPS AND VEHICLE HAVING THE SAME

(71) Applicant: FUYAO GLASS INDUSTRY GROUP CO., LTD., Fujian (CN)

(72) Inventors: Changhe Yu, Fujian (CN); Qiming Lin, Fujian (CN); Hua Chen, Fujian (CN); Ke Zhang, Fujian (CN); Dong Zeng, Fujian (CN); Liqiang Wang, Fujian (CN)

( * ) Notice: Subject to any disclaimer, the term of this patent is extended or adjusted under 35 U.S.C. 154(b) by 0 days.

(21) Appl. No.: 18/508,457

(22) Filed: Nov. 14, 2023

(65) Prior Publication Data

US 2024/0083352 A1    Mar. 14, 2024

Related U.S. Application Data

(63) Continuation of application No. PCT/CN2022/080954, filed on Mar. 15, 2022.

(30) Foreign Application Priority Data

May 25, 2021  (CN) .......................... 202110570803.0

(51) Int. Cl.
*B60Q 3/62* (2017.01)
*B60J 10/26* (2016.01)
(Continued)

(52) U.S. Cl.
CPC ................ *B60Q 3/62* (2017.02); *B60J 10/26* (2016.02); *B60J 10/35* (2016.02); *B60J 10/70* (2016.02);
(Continued)

(58) Field of Classification Search
CPC .... G02B 6/0078; F21S 43/235; F21S 43/236; F21S 41/24; F21S 43/237; F21S 43/245;
(Continued)

(56) References Cited

U.S. PATENT DOCUMENTS 6,327,954 B1 * 12/2001 Medlin .................... F41H 5/263
89/36.02
6,546,683 B1    4/2003  Senge
(Continued)

FOREIGN PATENT DOCUMENTS

CN       102785555 A      11/2012
CN       103754170 A       4/2014
(Continued)

OTHER PUBLICATIONS

International Search Report dated May 27, 2022 issued in PCT/CN2022/080954.
(Continued)

*Primary Examiner* — Abdulmajeed Aziz
*Assistant Examiner* — Steven Y Horikoshi
(74) *Attorney, Agent, or Firm* — Scully, Scott, Murphy & Presser, P.C.

(57) ABSTRACT

A vehicle window assembly and a vehicle are provided in the disclosure. The vehicle window assembly includes multiple light guide strips spaced apart from each other, a vehicle window glass sheet, and a sealing box. The multiple light guide strips are arranged on one side surface of the vehicle window glass sheet, the sealing box is disposed at one side of each of the multiple light guide strips away from the vehicle window glass sheet, the sealing box defines grooves at positions respectively corresponding to the multiple light guide strips, and each of the multiple light guide strips is received in one of the grooves. The multiple light guide strips are received in the sealing box, the sealing box
(Continued)

is directly fixed to the vehicle window glass sheet by the fixing member.

15 Claims, 8 Drawing Sheets

(51) Int. Cl.
  *B60J 10/35* (2016.01)
  *B60J 10/70* (2016.01)
  *B60Q 3/208* (2017.01)
  *B60Q 3/50* (2017.01)
  *B60Q 3/78* (2017.01)
  *F21V 8/00* (2006.01)

(52) U.S. Cl.
  CPC ............... *B60Q 3/208* (2017.02); *B60Q 3/50* (2017.02); *B60Q 3/78* (2017.02); *G02B 6/0068* (2013.01)

(58) Field of Classification Search
  CPC . F21W 2103/10; F21W 2103/15; B60Q 3/78; B60Q 1/268; B60Q 1/32–324; B60Q 1/62; B60Q 1/64; B60Q 1/66; B60Q 1/302; B32B 17/10541
  See application file for complete search history.

(56) References Cited

U.S. PATENT DOCUMENTS

| | | | |
|---|---|---|---|
| 2013/0033894 A1* | 2/2013 | Kleo | G02B 6/0095 362/602 |
| 2013/0051064 A1* | 2/2013 | Shiraishi | G02B 6/0061 362/602 |
| 2014/0003075 A1* | 1/2014 | Yamada | B60Q 1/268 362/511 |
| 2018/0052272 A1* | 2/2018 | Cornelissen | G02B 6/0021 |
| 2019/0025500 A1* | 1/2019 | Bhatia | B32B 17/10761 |
| 2020/0241189 A1* | 7/2020 | Schabacker | G02B 6/001 |
| 2023/0118480 A1* | 4/2023 | Pasquarelli | B60Q 3/64 296/215 |

FOREIGN PATENT DOCUMENTS

| | | |
|---|---|---|
| CN | 107074148 A | 8/2017 |
| CN | 207825900 U | 9/2018 |
| CN | 208730861 U | 4/2019 |
| CN | 111487706 A | 8/2020 |
| CN | 111559310 A | 8/2020 |
| CN | 211574858 U | 9/2020 |
| CN | 112512848 A | 3/2021 |
| DE | 10320614 A1 | 12/2004 |
| DE | 102007013627 A1 | 9/2008 |
| DE | 102011106595 A1 | 12/2012 |
| DE | 102016218755 B3 | 11/2017 |
| DE | 202017106805 U1 | 2/2019 |
| EP | 3093173 A1 | 11/2016 |
| FR | 3001674 A1 | 8/2014 |
| JP | H10147177 A | 6/1998 |
| JP | 2012077604 A | 4/2012 |
| JP | 2016004755 A | 1/2016 |
| JP | 2018188055 A | 11/2018 |
| KR | 20200021567 A | 3/2020 |
| WO | 2018069792 A1 | 4/2018 |
| WO | 2020089288 A1 | 5/2020 |

OTHER PUBLICATIONS

Notice of Allowance dated Jun. 22, 2022 issued in CN 202110570803.0.
Extended European search report dated Jul. 25, 2024 received in European Patent Application No. 22810135.8.
Notice of Reasons for Refusal dated Nov. 1, 2024 received in Japanese Patent Application No. 2023-565323.
Request for the Submission of an Opinion issued in corresponding KR application No. 10-2023-7036977 dated Apr. 14, 2025.
Examination Report issued in corresponding EP application No. 22810135.8 dated Apr. 17, 2025.

* cited by examiner

VEHICLE WINDOW ASSEMBLY WITH PLURALITY OF LIGHT GUIDE STRIPS AND VEHICLE HAVING THE SAME

CROSS-REFERENCE TO RELATED APPLICATION(S)

This application is a continuation of International Patent Application No. PCT/CN2022/080954, filed Mar. 15, 2022, which claims priority to Chinese Patent Application No. 202110570803.0, filed May 25, 2021, the disclosures of which are hereby incorporated by reference in their entireties.

TECHNICAL FIELD

The disclosure relates to the field of vehicle moulding, and in particular, to a vehicle window assembly and a vehicle.

BACKGROUND

Vehicles have always been one of important means of transportation for humanity. As people have higher and higher requirements on the aesthetic design of the vehicle, the use of a vehicle window assembly capable of emitting light on vehicle exteriors has gradually become popular, especially in well-known domestic or international mainstream automotive manufacturers, and the utilization of the vehicle window assembly capable of emitting light has become more prevalent.

Currently, light emission of the vehicle window assembly mainly depends on defining a hole in a bright strip, and then arranging a light source or a light guide behind the hole to achieve a light emission effect. However, the hole in the bright strip destroys the sealing performance, optical performance, etc. of the bright strip, and additional cooperation between the hole and the light source is required, which increases the technical costs.

SUMMARY

A vehicle window assembly is provided in the disclosure to eliminate the need for defining a hole in a bright strip, thereby reducing the technical costs.

In a first aspect, a vehicle window assembly is provided. The vehicle window assembly includes multiple light guide strips spaced apart from each other, a vehicle window glass sheet, and a sealing box. The multiple light guide strips are arranged on one side surface of the vehicle window glass sheet, the sealing box is disposed at one side of each of the multiple light guide strips away from the vehicle window glass sheet, the sealing box defines grooves at positions respectively corresponding to the multiple light guide strips, and each of the multiple light guide strips is received in one of the grooves.

The multiple light guide strips are received in the sealing box, the sealing box is directly fixed to the vehicle window glass sheet by the fixing member, thus there is no need to define a hole in the vehicle window glass sheet, thereby ensuring the sealing performance, optical performance, etc. of the vehicle window assembly and decreasing the technical costs.

In an embodiment, the vehicle window assembly further includes a bright strip and multiple light-emitting modules. The bright strip and the sealing box are opposite to each other to define a gap for accommodating the vehicle window glass sheet. Each of the multiple light-emitting modules is arranged within an orthographic projection of the bright strip on the vehicle window glass sheet, each of the multiple light-emitting modules defines a light-exiting opening, and a light ray exiting from the light-exiting opening corresponds to at least one of the multiple light guide strips.

In an embodiment, the bright strip includes a first bright portion and a second bright portion. The multiple light-emitting modules are arranged on the first bright portion, the second bright portion is connected to the first bright portion, the first bright portion and the second bright portion surround a space to define an accommodating region, and the multiple light guide strips are arranged within the accommodating region.

In an embodiment, each of the multiple light-emitting modules is configured to emit a light ray having a light intensity and color different from a light intensity and color of a light ray emitted by each of the other of the multiple light-emitting modules.

In an embodiment, the vehicle window assembly further includes multiple shielding members spaced apart from each other and multiple light-transmitting films spaced apart from each other, each of the multiple shielding members is adjacent to one of the multiple light-transmitting films, and an orthographic projection of each of the multiple light-transmitting films on the vehicle window glass sheet covers an orthographic projection of a corresponding light guide strip on the vehicle window glass sheet. A combination of an orthographic projection of each of the multiple shielding members on the vehicle window glass sheet and an orthographic projection of each of the multiple light-transmitting films on the vehicle window glass sheet covers an orthographic projection of the sealing box on the vehicle window glass sheet.

In an embodiment, each of the multiple light-transmitting films is configured to allow a light ray to pass through unidirectionally.

In an embodiment, the sealing box is integrally formed by injection molding. Each of the grooves has a semicircular shape, a rectangular shape, or a trapezoidal shape, or the grooves comprise various types of grooves among a semicircular groove, a rectangular groove, and a trapezoidal groove.

In an embodiment, the vehicle window assembly further includes fixing members. Each of the fixing members is configured to fix the sealing box to the vehicle window glass sheet. Each of the fixing members is an optical adhesive, a 3M™ adhesive, or a polyurethane adhesive, or the fixing members include various types of fixing members among the optical adhesive, the 3M™ adhesive, and the polyurethane adhesive.

In an embodiment, the vehicle window assembly further includes a hemming strip. The hemming strip is separated from the light guide strip and is configured to fix the vehicle window glass sheet.

In an embodiment, the vehicle window assembly further includes a bright strip, and the hemming strip and the bright strip cooperate to fix the vehicle window assembly to the hemming strip.

In a second aspect, a vehicle is further provided. The vehicle includes a frame and the vehicle window assembly provided in the first aspect, and the vehicle window assembly is mounted to the frame.

BRIEF DESCRIPTION OF THE DRAWINGS

In order to describe technical solutions in embodiments of the disclosure more clearly, the following will give a brief introduction to accompanying drawings required for describing the embodiments. Apparently, the accompanying drawings hereinafter described merely illustrate some embodiments of the disclosure. Based on the accompanying drawings, those of ordinary skills in the art can also obtain other drawings without creative effort.

Figure 1:
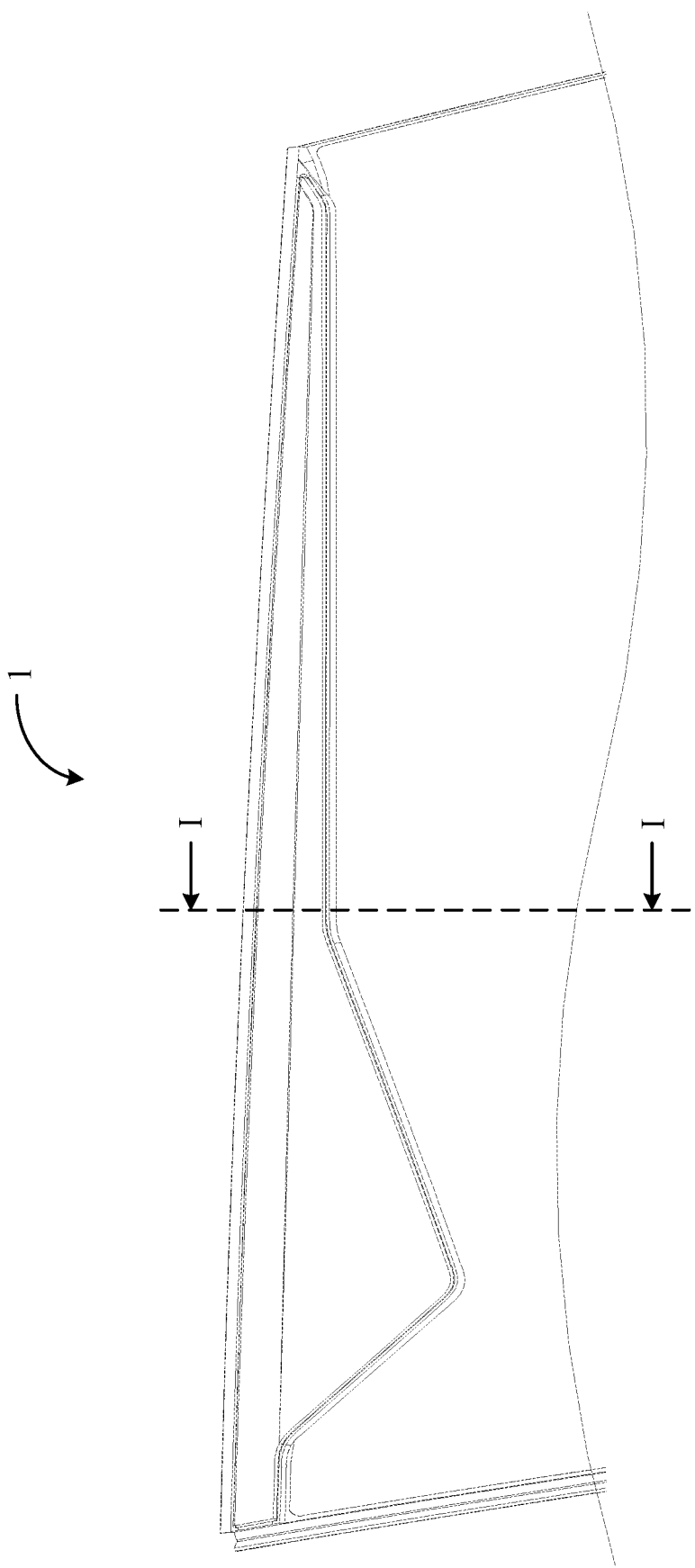
FIG. 1 is a schematic diagram of a vehicle window assembly according to an embodiment of the disclosure.

Reference numerals: vehicle window assembly—1, light guide strip—11, vehicle window glass sheet—12, sealing box—13, groove—131, fixing member—14, bright strip—15, first bright portion—151, second bright portion—152, accommodating region—153, light-emitting module—16, shielding member—17, light-transmitting film—18, hemming strip—19, vehicle—2, frame—21.

DETAILED DESCRIPTION

The technical solutions in embodiments of the disclosure are clearly and completely described hereinafter with reference to accompanying drawings in the embodiments of the disclosure. Apparently, the described embodiments are merely part of rather than all of the embodiments of the disclosure. All other embodiments obtained by those of ordinary skill in the art based on the embodiments provided herein without creative efforts shall fall within the scope of the disclosure.

Figure 2:
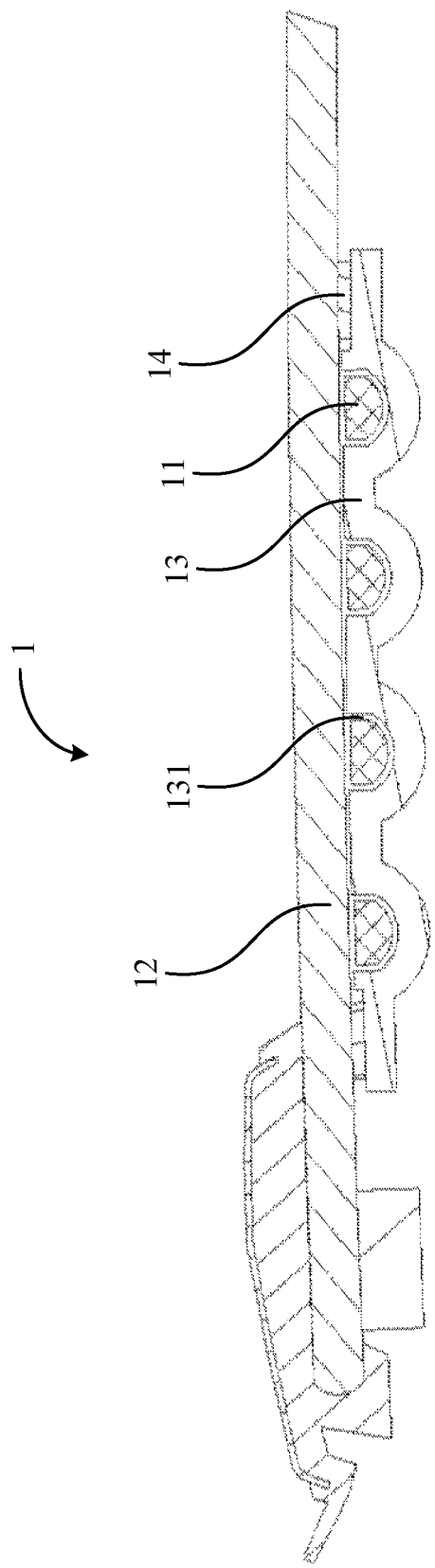
FIG. 2 is a schematic cross-sectional view taken along line I-I in FIG. 1.

The disclosure provides a vehicle window assembly 1 applicable to a vehicle window glass sheet 12. Referring to FIGS. 1 and 2 together, FIG. 1 is a schematic diagram of the vehicle window assembly according to an embodiment of the disclosure, and FIG. 2 is a schematic cross-sectional view taken along line I-I in FIG. 1. The vehicle window assembly 1 includes multiple light guide strips 11 spaced apart from each other, the vehicle window glass sheet 12, and a sealing box 13. The multiple light guide strips 11 are arranged on one side surface of the vehicle window glass sheet 12. The sealing box 13 is disposed at one side of each of the multiple light guide strips 11 away from the vehicle window glass sheet 12. The sealing box 13 defines grooves 131 at positions respectively corresponding to the multiple light guide strips 11, and each of the multiple light guide strips 11 is received in one of the grooves 131.

It should be noted that the light guide strip 11 can guide light incident on an interface of the light guide strip 11 to the entire light guide strip 11, thereby achieving illumination of the light guide strip 11 when exposed to light. Generally, the material of an inner side wall of the light guide strip 11 has high light reflectivity, so that the light is not subject to excessive lost during transmission in the light guide strip 11, thereby allowing the light to be transmitted in the entire light guide strip 11.

In the embodiments, as shown in FIG. 2, the vehicle window assembly 1 further includes fixing members 14. Each of the fixing members 14 is configured to fix the sealing box 13 to the vehicle window glass sheet 12. For a better visual effect, the multiple light guide strips 11 are arranged in parallel, and at the same time, in order to avoid affecting a visible range of the vehicle window glass sheet 12, the multiple light guide strips 11 are arranged adjacent to a periphery of the vehicle window glass sheet 12 (for example, an upper edge, a lower edge, a left edge, or a right edge of the vehicle window glass sheet 12). In other possible embodiments, the multiple light guide strips 11 may also be arranged to overlap or arranged at a certain angle to one another, which is not limited in the disclosure.

The grooves 131 defined in the sealing box 13 form a certain accommodation space for accommodating the light guide strips 11. Generally, a shape of the groove 131 matches a shape of the light guide strip 11. In other words, the light guide strip 11 abuts against the groove 131, thereby preventing the light guide strip 11 from deviating in the groove 131. Then, the sealing box 13 and the light guide strips 11 are fixed to the vehicle window glass sheet 12 by the fixing members 14.

It can be understood that, in the embodiments, the light guide strips 11 are accommodated in the sealing box 13, and the sealing box 13 is directly fixed to the vehicle window glass sheet 12 by the fixing members 14, thereby eliminating the need for defining a hole in the vehicle window assembly 1, thereby ensuring sealing performance, optical performance, and the like of the vehicle window assembly 1, and reducing technical costs.

Figure 3:
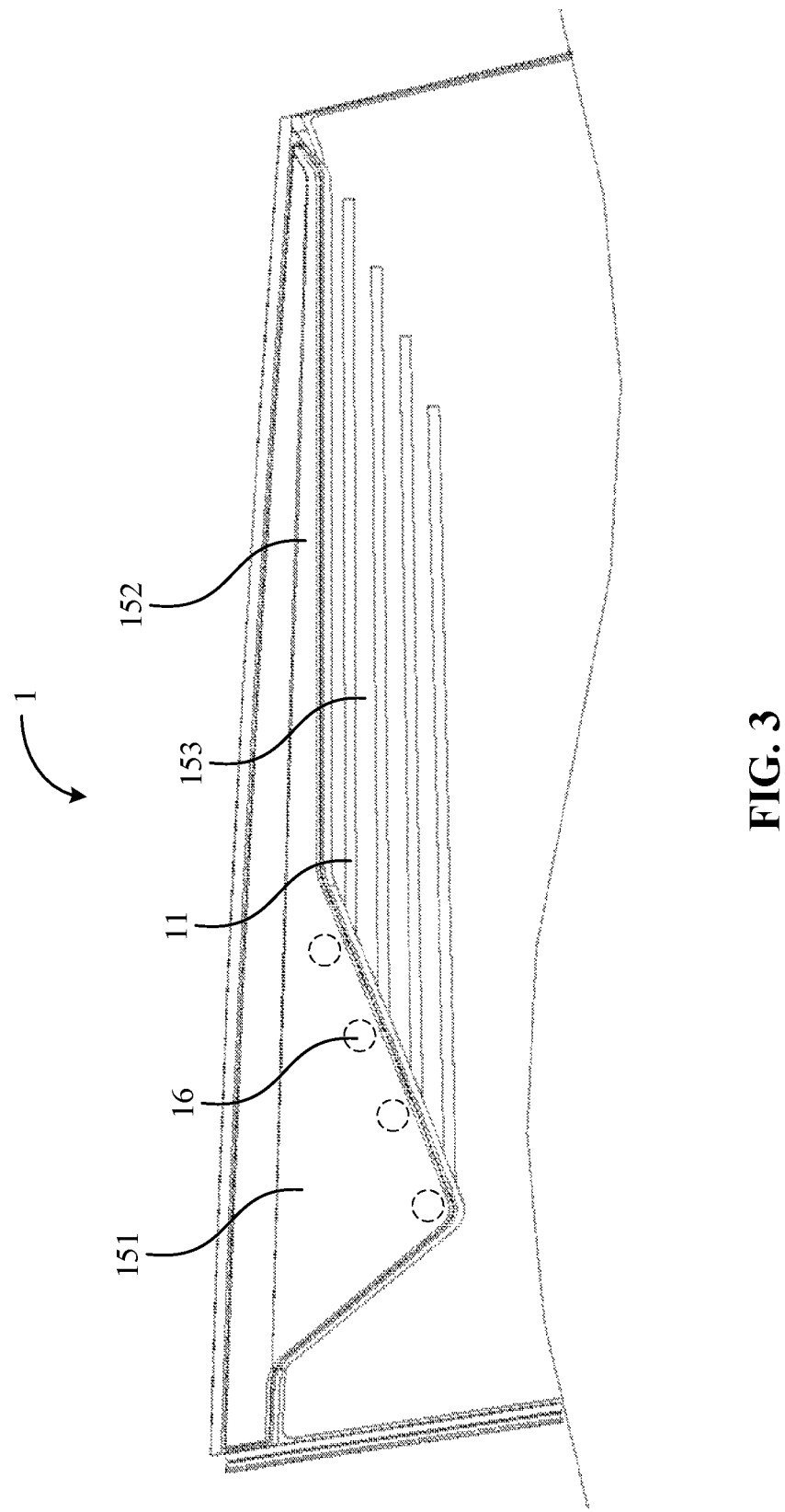
FIG. 3 is a schematic diagram of a vehicle window assembly according to another embodiment of the disclosure.

In a possible embodiment, referring to FIG. 3, FIG. 3 is a schematic diagram of a vehicle window assembly according to another embodiment of the disclosure. The vehicle window assembly 1 further includes a bright strip 15 and multiple light-emitting modules 16. The bright strip 15 and the sealing box 13 are opposite to each other to form a gap for accommodating the vehicle window glass sheet 12. Each of the multiple light-emitting modules 16 is arranged within an orthographic projection of the bright strip 15 on the vehicle window glass sheet 12, and each of the multiple light-emitting modules 16 defines a light-exiting opening, and a light ray exiting from the light-exiting opening corresponds to one the multiple light guide strips 11.

It should be noted that, in order to more clearly illustrate an arrangement relationship of various components of the vehicle window assembly 1 under the bright strip 15 and the vehicle window glass sheet 12, various components of the vehicle window assembly 1 are illustrated in the figures in a perspective manner, which does not mean that the various components of the vehicle window assembly 1 can be directly observed from a schematic diagram of the vehicle window glass sheet 12.

When the gap between the bright strip 15 and the sealing box 13 is configured to receive the vehicle window glass sheet 12, the bright strip 15 and the sealing box 13 are disposed on two opposite sides of the vehicle window glass sheet 12.

In the embodiments, the bright strip 15 is made of opaque stainless steel and formed through stamping, and the light-emitting modules 16 are arranged within an orthographic projection of the bright strip 15 on the vehicle window glass sheet 12. In other words, the light-emitting module 16 is disposed under the bright strip 15, so that during operation of the light-emitting module 16, light emitted from the light-emitting module 16 is unlikely to leak from under the bright strip 15. The light-emitting module 16 may be fixed to the bright strip 15 through the fixing member 14 or may be integrally formed with the bright strip 15, as long as it does not affect that the light ray exiting from the light-exiting opening corresponds to at least one of the light guide strips 11, which is not limited in the disclosure.

Specifically, in the embodiments, the light ray that is emitted by each light-emitting module 16 and exits from the light-exiting opening corresponds to one light guide strip 11. In other possible embodiments, the light ray that is emitted from a single light-emitting module 16 and exits from the light-exiting opening may correspond to two light guide strips 11, three light guide strips 11, four light guide strips 11, or the like, which is not limited in the disclosure. The light incident into the light guide strips 11 is reflected by an inner side wall of the light guide strip 11 to the entire light guide strips 11, thereby achieving the illumination of the entire light guide strip 11.

In a possible embodiment, referring to FIG. 3, the bright strip 15 includes a first bright portion 151 and a second bright portion 152. The multiple light-emitting modules 16 are arranged on the first bright portion 151. The first bright portion 151 is connected to the second bright portion 152. The first bright portion 151 and the second bright portion 152 surround a space to define an accommodating region 153, and the multiple light guide strips 11 are arranged within the accommodating region 153.

Specifically, in the embodiments, an orthographic projection of the light guide strip 11 on the vehicle window glass sheet 12 extends from an orthographic projection of the first bright portion 151 on the vehicle window glass sheet 12. In other words, light transmitted from the light guide strip 11 will not be blocked by the bright strip 15. As shown in FIG. 3, the light guide strip 11 is parallel to an extending direction of the second bright portion 152. Moreover, in the embodiments, each of the multiple light guide strips 11 has the same length as each of the other of the multiple light guide strips 11, and a position of the first bright portion 151 through which each of the multiple light guide strips 11 extends is different from a position of the first bright portion 151 through which each of the other of the multiple light guide strips 11 extends, thus a certain sense of layering is achieved, thereby improving the aesthetic level of the vehicle window assembly 1, and avoiding affecting the visual range of the vehicle window glass sheet 12.

In other possible embodiments, the light guide strip 11 may also be disposed at an angle to the second bright portion 152. For example, an included angle between the light guide strip 11 and the second bright portion 152 is within a range of ±10 degrees, which is not limited in the disclosure.

In a possible embodiment, each of the multiple light-emitting modules 16 is configured to emit a light ray having a light intensity and color different from a light intensity and color of a light ray emitted by each of the other of the multiple light-emitting modules.

Specifically, each of the multiple light-emitting modules 16 may emit a light ray different from a color of a light ray emitted by each of the other of the multiple light-emitting modules 16 under the control of an on-board processor, or alternatively, under the control of an electrical signal received from an electronic device, which is not limited in the disclosure. It can be understood that a light rat generally has multiple different parameters, which may be light intensity, color, and the like in visual experience. By providing different numbers of the light-emitting modules 16 and the light guide strips 11, various combinations of different light intensities and colors can be achieved. For example, in the embodiments, four light-emitting modules 16 and four light guide strips 11 are provided, so that a red light ray, a green light ray, a blue light ray, and a yellow light ray can be respectively emitted by the four light-emitting modules 16 in the order in which the four light guide strips 11 are arranged, or a red light ray, a green light ray, a red light ray, and a green light ray can be respectively emitted by the four light-emitting modules 16 in the order in which the four light guide strips 11 are arranged, which is not limited in the disclosure.

It should be noted that, due to the extended transmission capability of red light within the visible spectrum, in the related art, a vehicle headlight and a vehicle taillight in a driving direction of a vehicle are typically configured to emit red light to show front and rear contours of the vehicle. However, a side contour of the vehicle cannot be shown, and there is a certain driving risk. It can be understood that, in the embodiments, the light guide strips 11 are arranged in the vehicle window assembly 1 of the vehicle window glass sheet 12 that is disposed on a side of the vehicle in the driving direction of the vehicle, thus red light can be transmitted through the light guide strips 11 to show a side contour of the vehicle in the driving direction of the vehicle, thereby further reducing a driving risk.

Figure 4:
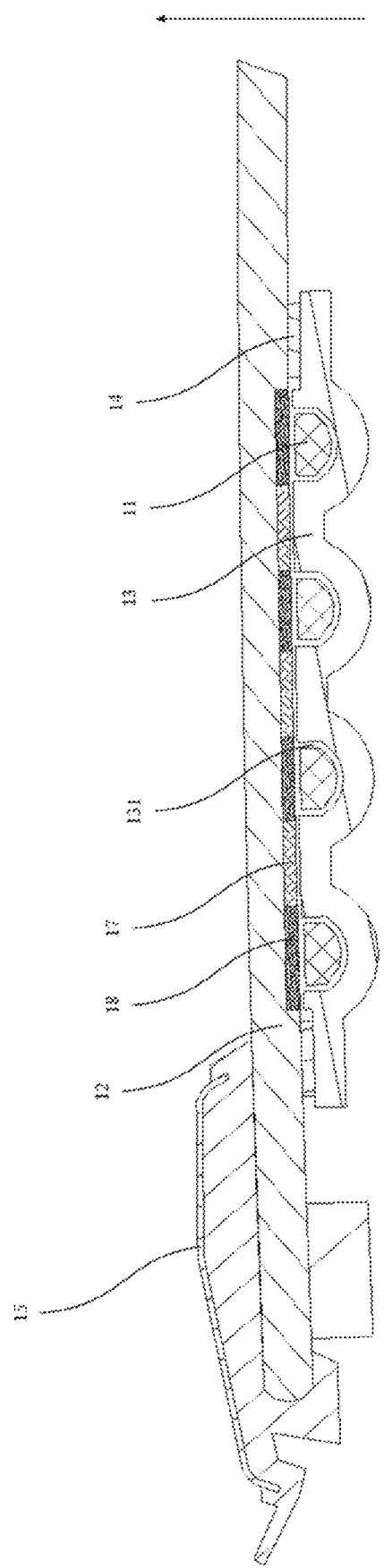
FIG. 4 is a schematic cross-sectional view of a vehicle window assembly according to another embodiment of the disclosure.

In a possible embodiment, referring to FIG. 4, FIG. 4 is a schematic cross-sectional view of a vehicle window assembly according to an embodiment of the disclosure. The vehicle window assembly 1 further includes multiple shielding members 17 spaced apart from each other and multiple light-transmitting films 18 spaced apart from each other. Each of the multiple shielding members 17 is adjacent to and connected to one of the multiple light-transmitting films 18. An orthographic projection of each of the multiple light-transmitting film 18 on the vehicle window glass sheet 12 covers an orthographic projection of a corresponding light guide strip 11 on the vehicle window glass sheet 12, and a combination of an orthographic projection of each of the multiple shielding members 17 on the vehicle window glass sheet 12 and an orthographic projection of each of the multiple light-transmitting films 18 on the vehicle window glass sheet 12 covers an orthographic projection of the sealing box 13 on the vehicle window glass sheet 12. In another embodiment, the orthographic projection of each of the multiple light-transmitting film 18 on the vehicle window glass sheet 12 covers the orthographic projection of a corresponding light guide strip 11 on the vehicle window glass sheet 12, and the combination of the orthographic projection of each of the multiple shielding members 17 on the vehicle window glass sheet 12 and the orthographic projection of each of the multiple light-transmitting films 18 on the vehicle window glass sheet 12 is covered by the orthographic projection of the sealing box 13 on the vehicle window glass sheet 12.

It should be noted that, generally, the vehicle window glass sheet 12 is of a sandwich design, and in order to shield part of components from being visible, the vehicle window glass sheet 12 is further provided with the shielding member 17 for shielding. In the embodiments, in order to allow a light ray from the light guide strips 11 to be normally irradiated out through the vehicle window glass sheet 12, a hollow design is defined in part of the shielding member 17 corresponding to the light guide strips 11. At the same time, the light-transmitting films 18 are provided on portions corresponding to the light guide strips 11, so that the light ray from the light guide strips 11 can be irradiated out through the light-transmitting film 18.

In the embodiments, the shielding member 17 and the light-transmitting film 18 are disposed on a side surface of the vehicle window glass sheet 12 close to the light guide strip 11. In other possible embodiments, the shielding member 17 and the light-transmitting film 18 may also be disposed at other positions of the vehicle window glass sheet 12, which is not limited in the disclosure.

In a possible embodiment, the light-transmitting film 18 is configured to allow a light ray to pass through unidirectionally.

Specifically, in order to prevent the light guide strips 11 from being visible through the vehicle window glass sheet 12, the light-transmitting film 18 is configured to allow a light ray to pass through unidirectionally. In other words, in the embodiments, the light-transmitting film 18 is configured to allow a light ray to pass through only in the same as a direction of the light ray from the light guide strip, as indicated by the arrow in FIG. 4. When the light guide strips 11 transmit light, light transmitted by the light guide strips 11 is visible viewed from a side of the vehicle window glass sheet 12 away from the light guide strips 11. When the light guide strip 11 does not transmit light, the light guide strips 11 is invisible viewed from the side of the vehicle window glass sheet 12 away from the light guide strip 11. As can be appreciated, this arrangement enhances the aesthetic design of the vehicle window assembly 1.

Figure 5:
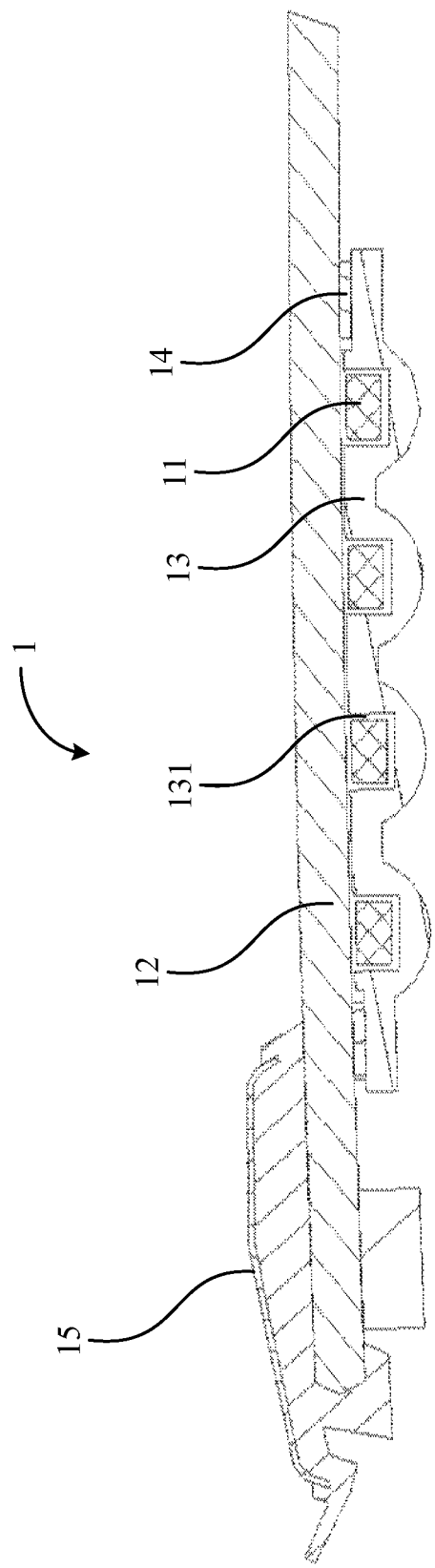
FIG. 5 is a schematic cross-sectional view of a vehicle window assembly according to another embodiment of the disclosure.
Figure 6:
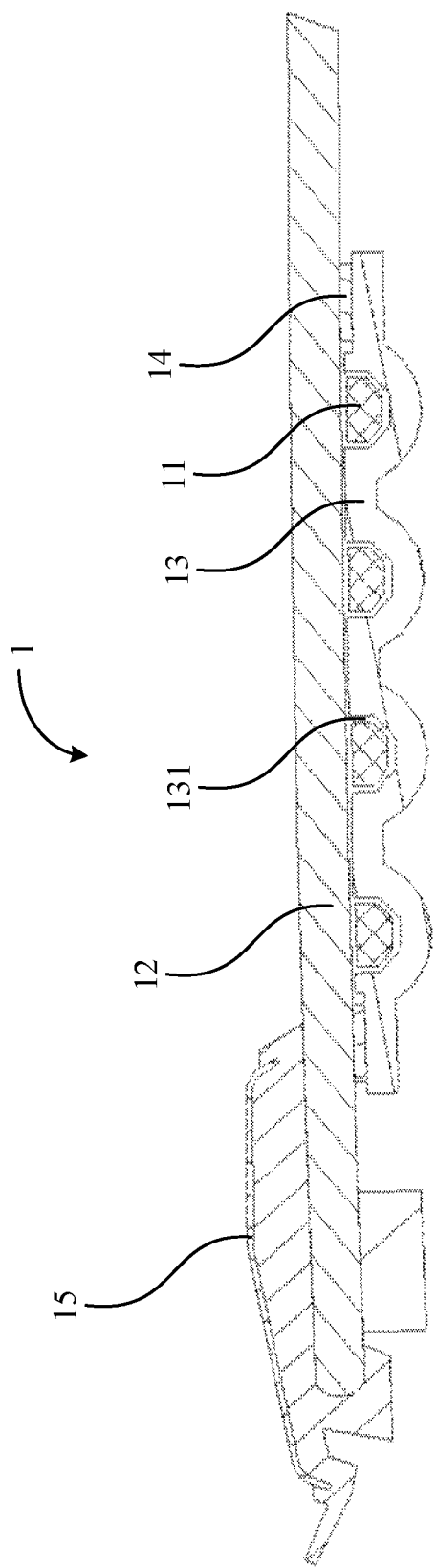
FIG. 6 is a schematic cross-sectional view of a vehicle window assembly according to another embodiment of the disclosure.

Specifically, as shown in FIG. 4, the light-transmitting film 18 covers the orthographic projection of the light guide strip 11 on the vehicle window glass sheet 12, so that the light guide strip 11 is invisible when the light guide strip 11 does not transmit light. In other possible embodiments, the light guide strips 11 may also be made invisible in other manners, for example, the light guide strip 11 is made from a material approximate to glass in appearance, which is not limited in the disclosure. In a possible embodiment, referring to FIGS. 5 and 6 together, FIG. 5 is a schematic cross-sectional view of a vehicle window assembly according to another embodiment of the disclosure, and FIG. 6 is a schematic cross-sectional view of a vehicle window assembly according to another embodiment of the disclosure. The sealing box 13 is integrally formed by injection molding. Each of the grooves 131 has a semicircular shape, a rectangular shape, or a trapezoidal shape, or the grooves 131 include various types of grooves among a semicircular groove, a rectangular groove, and a trapezoidal groove.

Specifically, the sealing box 13 is integrally formed by injection molding, so that the sealing box 13 has good sealing performance and optical performance. When the light guide strip 11 accommodated in the groove 131 transmits light, the light is unlikely to leak from the sealing box 13.

It should be noted that, the shape of the groove 131 refers to a shape of a cross-section of the groove 131 in a cross-sectional view. As shown in FIG. 2, the shape of the groove 131 is a semicircle. As shown in FIG. 5, the shape of the groove 131 is a rectangle. As shown in FIG. 6, the shape of the groove 131 is a trapezoid. It can be understood that, the shape of the groove 131 is not limited in the disclosure as long as the deviation does not occur to the light guide strips 11 accommodated in the groove 131.

In a possible embodiment, each of the fixing members 14 is an optical adhesive, a 3M™ adhesive, or a polyurethane adhesive, or the fixing members 14 include various types of fixing members among the optical adhesive, the 3M™ adhesive, and the polyurethane adhesive.

Specifically, because the vehicle window glass sheet 12 is easy to fracture, the fixing member 14 is generally an adhesive, such as optical adhesive, a 3M™ adhesive, a polyurethane adhesive, or the like. In other possible embodiments, the fixing member 14 may also be an adhesive tape or a snap-fitting structure, which is not limited in the disclosure as long as the fixing member 14 does not bring damage to the vehicle window glass sheet 12.

Figure 7:
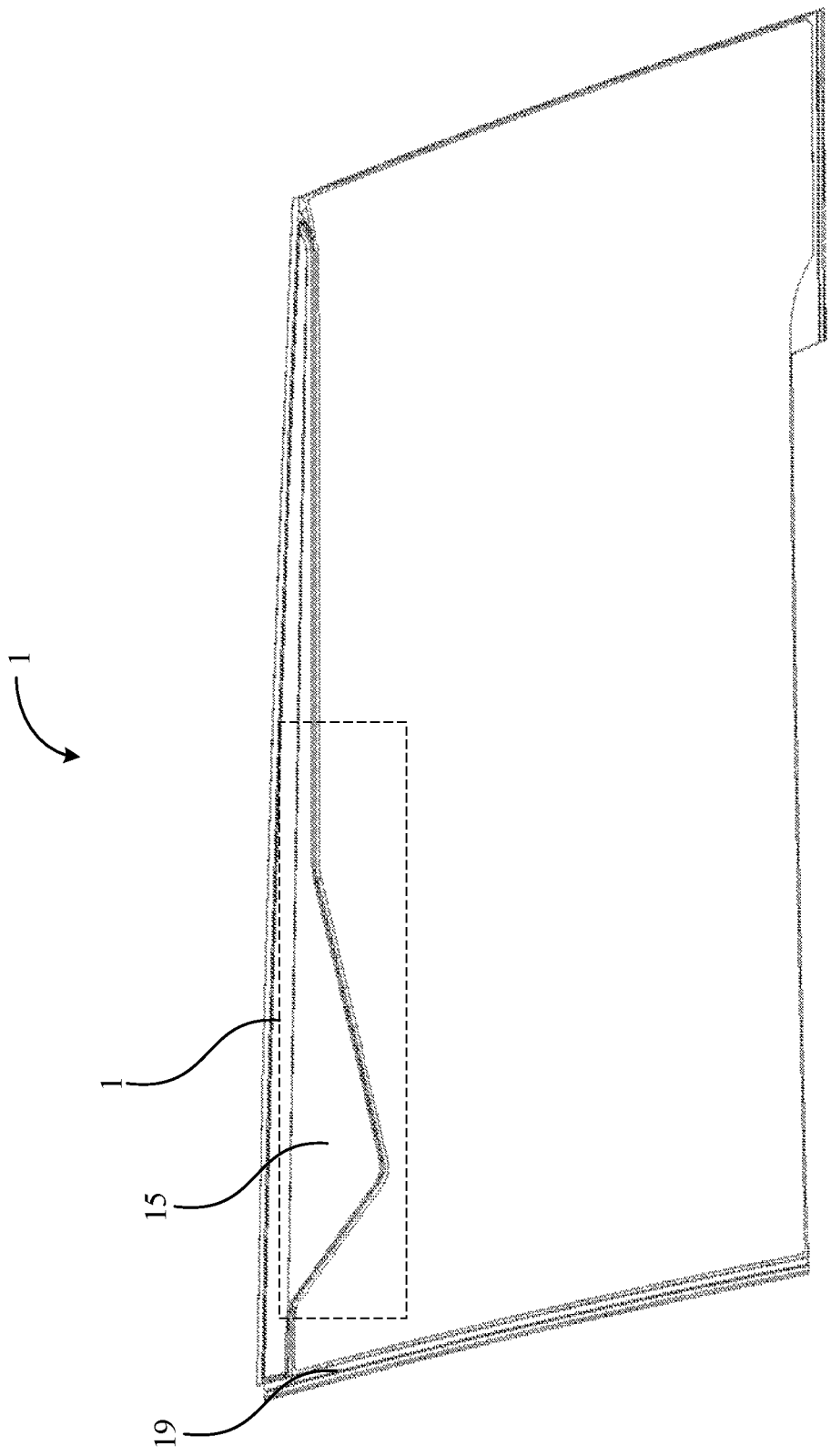
FIG. 7 is a schematic diagram of a vehicle window assembly according to another embodiment of the disclosure.

In a possible embodiment, referring to FIG. 7, FIG. 7 is a schematic diagram of a vehicle window assembly according to another embodiment of the disclosure. The vehicle window assembly 1 includes a hemming strip 19. The hemming strip 19 is separated from the light guide strip 11 and is configured to fix the vehicle window glass sheet 12.

Specifically, for the vehicle window assembly 1, reference may be made to the foregoing description, and details are not described herein again. The hemming strip 19 is generally made of a rubber, thus when the vehicle window glass sheet 12 is fixed, it is not easy to damage the vehicle window glass sheet 12, and at the same time, good sealing performance is achieved. When the vehicle window glass sheet 12 is fixed on a frame through the hemming strip 19, it is not easy to break the sealing performance of the vehicle.

It should be noted that the hemming strip 19 is separated from the light guide strip 11. In other words, the hemming strip 19 is not integrally formed with the light guide strip 11, and a mold of the hemming strip 19 can be designed separately from a mold of the light guide strip 11.

In a possible embodiment, the vehicle window assembly 1 further includes a bright strip 15. The hemming strip 19 and the bright strip 15 cooperate to fix the vehicle window assembly 1 to the hemming strip 19.

Specifically, in the embodiments, the bright strip 15 is made of stainless steel and is formed through stamping, a snap-fitting part is arranged at a part of the bright strip 15 corresponding to the hemming strip 19, and the bright strip 15 is snap-fitted with the hemming strip 19 through the snap-fitting part, so that the vehicle window assembly 1 is fixed to the hemming strip 19. In other possible embodiments, the manner in which the vehicle window assembly 1 is fixed to the hemming strip 19 is not limited in the disclosure.

It can be understood that, in the embodiments, the vehicle window assembly 1 is independent from the hemming strip 19, and when a mold of the vehicle window assembly 1 or a mold of the hemming strip 19 may be changed subsequently, a mold of one of the vehicle window assembly 1 and the hemming strip 19 can be changed without affecting the other, thereby reducing the technical costs.

Figure 8:
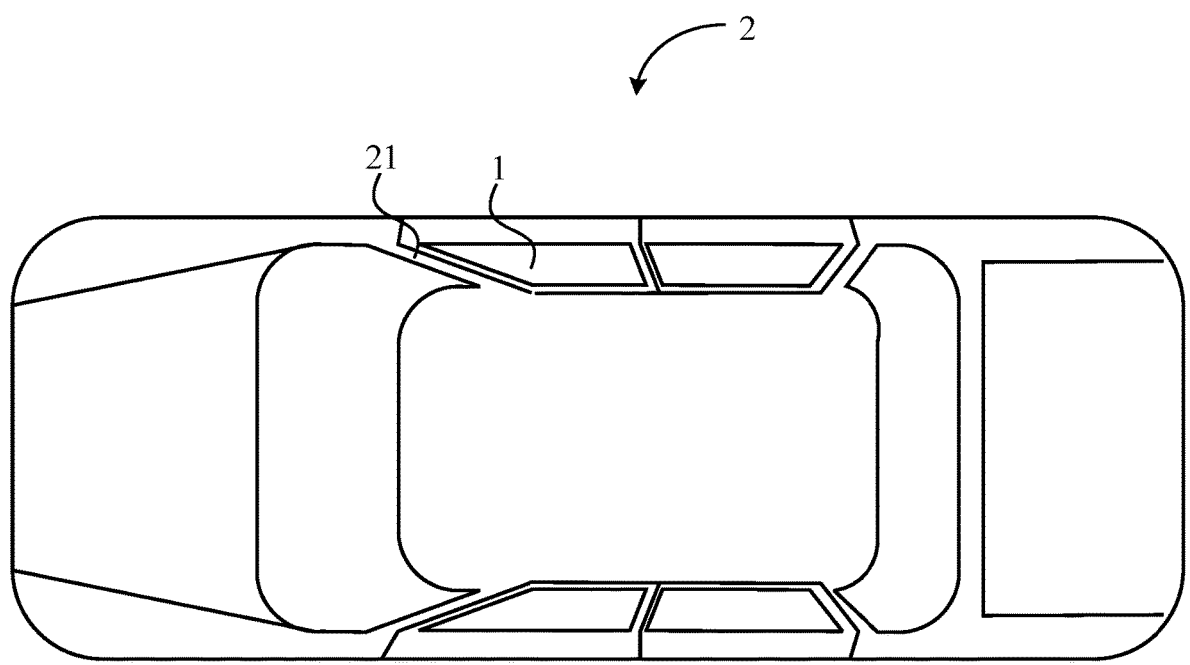
FIG. 8 is a schematic top view of a vehicle according to an embodiment of the present disclosure.

The disclosure also provides a vehicle 2. Referring to FIG. 8, FIG. 8 is a schematic top view of a vehicle according to an embodiment of the disclosure. The vehicle 2 includes a frame 21 and the vehicle window assembly 1 as described above, and the vehicle window glass sheet 12 is fixed to the frame 21 through the hemming strip 19. Specifically, for the vehicle window assembly 1, reference may be made to the foregoing illustration, and details are not repeatedly described herein.

Specific examples are applied here to set forth the principle and the embodiments of the disclosure, and the foregoing illustration of the embodiments is only to help in understanding the core idea of the disclosure. Meanwhile, those of ordinarily skill in the art may make variations and modifications to the disclosure in terms of the specific embodiments and application scopes according to the ideas of the disclosure. Therefore, the specification shall not be construed as limitations to the disclosure.

What is claimed is:

1. A vehicle window assembly, comprising a plurality of light guide strips spaced apart from each other, a vehicle window glass sheet, a sealing box, a bright strip, and a plurality of light-emitting modules, wherein
the plurality of light guide strips are arranged on one side surface of the vehicle window glass sheet, the sealing box is disposed at one side of each of the plurality of light guide strips away from the vehicle window glass sheet, the sealing box defines grooves at positions respectively corresponding to the plurality of light guide strips, and each of the plurality of light guide strips is received in one of the grooves;
the bright strip is opaque, the bright strip and the sealing box are opposite to each other to define a gap for accommodating the vehicle window glass sheet, wherein each of the plurality of light-emitting modules is arranged within an orthographic projection of the bright strip on the vehicle window glass sheet, each of the plurality of light-emitting modules defines a light-exiting opening, and the light-exiting opening corresponds to at least one of the plurality of light guide strips; and
the bright strip comprises a first bright portion and a second bright portion, wherein the plurality of light-emitting modules are arranged on the first bright portion, the second bright portion is connected to the first bright portion, the first bright portion and the second bright portion surround a space to define an accommodating region, and the plurality of light guide strips are arranged within the accommodating region.

2. The vehicle window assembly of claim 1, wherein each of the plurality of light-emitting modules is configured to emit a light ray having a light intensity and color different from a light intensity and color of a light ray emitted by each of the other of the plurality of light-emitting modules.

3. The vehicle window assembly of claim 1, further comprising a plurality of shielding members spaced apart from each other and a plurality of light-transmitting films spaced apart from each other, each of the plurality of shielding members is adjacent to and connected to one of the plurality of light-transmitting films, an orthographic projection of each of the plurality of light-transmitting films on the vehicle window glass sheet covers an orthographic projection of a corresponding light guide strip on the vehicle window glass sheet, and a combination of an orthographic projection of each of the plurality of shielding members on the vehicle window glass sheet and an orthographic projection of each of the plurality of light- transmitting films on the vehicle window glass sheet is covered by an orthographic projection of the sealing box on the vehicle window glass sheet.

4. The vehicle window assembly of claim 3, wherein each of the plurality of light-transmitting films is configured to allow a light ray to pass through unidirectionally.

5. The vehicle window assembly of claim 1, wherein the sealing box is integrally formed by injection molding; and each of the grooves has a semicircular shape, a rectangular shape, or a trapezoidal shape, or the grooves comprise various types of grooves among a semicircular groove, a rectangular groove, and a trapezoidal groove.

6. The vehicle window assembly of claim 1, further comprising fixing members, wherein each of the fixing members is configured to fix the sealing box to the vehicle window glass sheet; and each of the fixing members is an optical adhesive, a 3M™ adhesive, or a polyurethane adhesive, or the fixing members comprise various types of fixing members among the optical adhesive, the 3M™ adhesive, and the polyurethane adhesive.

7. The vehicle window assembly of claim 1, further comprising a hemming strip, wherein the hemming strip is separated from the light guide strip and is configured to fix the vehicle window glass sheet.

8. The vehicle window assembly of claim 1, wherein an orthographic projection of the light guide strip on the vehicle window glass sheet extends from an orthographic projection of the bright strip on the vehicle window glass sheet.

9. A vehicle, comprising a frame and a vehicle window assembly mounted to the frame, wherein the vehicle window assembly comprises a plurality of light guide strips spaced apart from each other, a vehicle window glass sheet, a sealing box, a bright strip, and a plurality of light-emitting modules, wherein
the plurality of light guide strips are arranged on one side surface of the vehicle window glass sheet, the sealing box is disposed at one side of each of the plurality of light guide strips away from the vehicle window glass sheet, the sealing box defines grooves at positions respectively corresponding to the plurality of light guide strips, and each of the plurality of light guide strips is received in one of the grooves;
the bright strip is opaque, the bright strip and the sealing box are opposite to each other to define a gap for accommodating the vehicle window glass sheet, wherein each of the plurality of light-emitting modules is arranged within an orthographic projection of the bright strip on the vehicle window glass sheet, each of the plurality of light-emitting modules defines a light-exiting opening, and the light-exiting opening corresponds to at least one of the plurality of light guide strips;
the bright strip comprises a first bright portion and a second bright portion, wherein the plurality of light-emitting modules are arranged on the first bright portion, the second bright portion is connected to the first bright portion, the first bright portion and the second bright portion surround a space to define an accommodating region, and the plurality of light guide strips are arranged within the accommodating region.

10. The vehicle of claim 9, wherein each of the plurality of light- emitting modules is configured to emit a light ray having a light intensity and color different from a light intensity and color of a light ray emitted by each of the other of the plurality of light-emitting modules.

11. The vehicle of claim 9, further comprising a plurality of shielding members spaced apart from each other and a plurality of light-transmitting films spaced apart from each other, each of the plurality of shielding members is adjacent to and connected to one of the plurality of light-transmitting films, an orthographic projection of each of the plurality of light-transmitting films on the vehicle window glass sheet covers an orthographic projection of a corresponding light guide strip on the vehicle window glass sheet, and a combination of an orthographic projection of each of the plurality of shielding members on the vehicle window glass sheet and an orthographic projection of each of the plurality of light-transmitting films on the vehicle window glass sheet is covered by an orthographic projection of the sealing box on the vehicle window glass sheet.

12. The vehicle of claim 11, wherein each of the plurality of light-transmitting films is configured to allow a light ray to pass through unidirectionally.

13. The vehicle of claim 9, wherein the sealing box is integrally formed by injection molding; and each of the grooves has a semicircular shape, a rectangular shape, or a trapezoidal shape, or the grooves comprise various types of grooves among a semicircular groove, a rectangular groove, and a trapezoidal groove.

14. The vehicle of claim 9, further comprising fixing members, wherein each of the fixing members is configured to fix the sealing box to the vehicle window glass sheet; and
   each of the fixing members is an optical adhesive, a 3M™ adhesive, or a polyurethane adhesive, or the fixing members comprise various types of fixing members among the optical adhesive, the 3M™ adhesive, and the polyurethane adhesive.

15. The vehicle of claim 9, further comprising a hemming strip, wherein the hemming strip is separated from the light guide strip and is configured to fix the vehicle window glass sheet.

* * * * *